United States Patent
Jang

(10) Patent No.: US 11,904,704 B2
(45) Date of Patent: Feb. 20, 2024

(54) BATTERY RELEASE SYSTEM FOR VEHICLE

(71) Applicants: Hyundai Motor Company, Seoul (KR); Kia Motors Corporation, Seoul (KR)

(72) Inventor: Mu Ryong Jang, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 587 days.

(21) Appl. No.: 16/950,376

(22) Filed: Nov. 17, 2020

(65) Prior Publication Data

US 2021/0284027 A1 Sep. 16, 2021

(30) Foreign Application Priority Data

Mar. 11, 2020 (KR) .................. 10-2020-0029923

(51) Int. Cl.
*B60L 3/00* (2019.01)
*B60K 1/04* (2019.01)
(Continued)

(52) U.S. Cl.
CPC .............. *B60L 3/0007* (2013.01); *B60K 1/04* (2013.01); *B60L 3/0046* (2013.01);
(Continued)

(58) Field of Classification Search
CPC .... B60K 1/04; B60K 1/00; B60K 2001/0455; B60K 2001/0405; B60K 2001/0461; B60K 2001/0438; B60K 2001/0472; B60K 2001/0488; B60S 5/06; B60Y 2200/14; B60Y 2200/91; B60Y 2200/90; B60Y 2200/92; B60Y 2306/01; B60Y 2300/92; B60Y 2400/11; B60Y 2400/112; B60Y 2400/30; B60Y 2400/302; B60Y 2400/3042; B60Y 2400/308; B60L 3/0007; B60L 3/0046; B60L 3/0069; B60L 3/0038; B60L 3/0092; B60L 3/00; B60L 3/0084; B60L 3/04; B60L 2200/18; B60L 2200/36; B60L 53/80; G08B 17/00; H01M 10/425; H01M 10/48; H01M 10/42; H01M 10/486;
(Continued)

(56) References Cited

U.S. PATENT DOCUMENTS

| 7,488,546 B2 * | 2/2009 | Kim ................... A62C 3/16 429/96 |
| 7,543,666 B2 * | 6/2009 | Connelly ............ H01M 50/244 180/68.5 |

(Continued)

*Primary Examiner* — James M Dolak
(74) *Attorney, Agent, or Firm* — Fox Rothschild LLP

(57) ABSTRACT

A system can prevent burning of a vehicle or human injury caused by a fire spread from a battery to a vehicle in the event of a fire in the battery of an eco-friendly vehicle. The system can release a battery from the vehicle such that the battery can be separated and removed from the vehicle when a fire occurs in the battery. The system is operated in response to a control signal of a controller detecting the fire in the battery and by manipulation of a driver, and releases a state of the battery mounted to a vehicle body to release the battery from the vehicle such that the battery can be separated or removed from the vehicle.

16 Claims, 7 Drawing Sheets

(51) Int. Cl.
*G07C 5/08* (2006.01)
*B60K 6/28* (2007.10)

(52) U.S. Cl.
CPC .............. *G07C 5/0816* (2013.01); *B60K 6/28* (2013.01); *B60K 2001/0455* (2013.01); *B60Y 2200/91* (2013.01); *B60Y 2200/92* (2013.01); *B60Y 2400/112* (2013.01)

(58) Field of Classification Search
CPC ......... H01M 2200/00; H01M 2200/10; H01M 2220/20; H01M 50/20; H01M 50/209; H01M 50/249; H01M 50/262; H01M 50/264; H01M 50/204; H01M 50/202; H01M 50/242; H01M 50/244; H01M 50/383; H01M 50/572; H01M 50/581
See application file for complete search history.

(56) References Cited

U.S. PATENT DOCUMENTS

| | | | | |
|---|---|---|---|---|
| 8,276,698 B2 * | 10/2012 | Guss | ................. | B60L 50/66 180/68.5 |
| 8,517,131 B2 * | 8/2013 | Kovach | ............... | H01M 50/249 180/68.5 |
| 8,733,465 B1 * | 5/2014 | Flood | .................. | H01M 50/213 169/56 |
| 8,889,277 B2 * | 11/2014 | Lakamraju | .......... | E05B 17/0075 70/277 |
| 8,936,124 B2 * | 1/2015 | Auer | ....................... | B60L 50/64 180/68.5 |
| 9,083,064 B2 * | 7/2015 | LePort | ................. | H01M 10/42 |
| 9,142,866 B2 * | 9/2015 | Droste | ................... | B60L 50/66 |
| 9,248,746 B2 * | 2/2016 | Wen | ..................... | H01M 10/488 |
| 9,267,993 B2 * | 2/2016 | Farmer | ................. | H01G 11/10 |
| 9,539,448 B2 * | 1/2017 | Jung | ....................... | A62C 3/16 |
| 9,630,483 B2 * | 4/2017 | Yamada | .................... | B60K 1/04 |
| 9,954,259 B1 * | 4/2018 | Grace | .................... | B60L 58/25 |
| 10,035,032 B2 * | 7/2018 | Li | ........................... | B60L 58/27 |
| 10,559,858 B2 * | 2/2020 | Goitsuka | ........... | H01M 50/298 |
| 10,777,856 B2 * | 9/2020 | Stachewicz | ......... | H01M 10/488 |
| 10,892,469 B2 * | 1/2021 | Werner | ............... | H01M 10/425 |
| 10,960,246 B2 * | 3/2021 | Stadler | ................. | B60L 50/64 |
| 11,083,918 B2 * | 8/2021 | Wlodarczyk | ........ | A62D 1/0092 |
| 11,588,338 B2 * | 2/2023 | Zhang | ................. | H01M 50/262 |
| 11,791,502 B2 * | 10/2023 | Hilligoss | ............. | H01M 50/342 429/7 |
| 2010/0145717 A1 * | 6/2010 | Hoeltzel | .................. | B60K 1/04 320/109 |
| 2015/0132616 A1 * | 5/2015 | Sahner | .............. | H01M 10/4257 429/61 |
| 2016/0279453 A1 | 9/2016 | Ernfjall | | |
| 2018/0159110 A1 * | 6/2018 | Tuomola | ................ | B60L 53/80 |

* cited by examiner

BATTERY RELEASE SYSTEM FOR VEHICLE

CROSS REFERENCE TO RELATED APPLICATION

The present application claims under 35 U.S.C. § 119(a) the benefit of Korean Patent Application No. 10-2020-0029923, filed Mar. 11, 2020, the entire contents of which are incorporated by reference herein.

BACKGROUND

(a) Technical Field

The present disclosure relates generally to a battery release system for a vehicle, more particularly, to the battery release system, whereby a battery is released from a vehicle and separated from the vehicle in an emergency.

(b) Description of the Related Art

Due to environmental regulations, eco-friendly vehicles such as electric vehicles, hybrid electric vehicles, and fuel cell vehicles, each being driven by a motor, have been proliferating around the world.

Such eco-friendly vehicles include a hybrid electric vehicle (HEV), a battery electric vehicle (BEV), a fuel cell electric vehicle (FCEV), etc.

A plug-in HEV (PHEV) is known as the hybrid electric vehicle, and the PHEV and the BEV are electric vehicles, in which power is received from outside the vehicle to charge a battery.

These eco-friendly vehicles have common features in that they are provided with a motor as a drive device and with a battery supplying power to the motor.

In the case of a fire in a battery in an eco-friendly vehicle, the fire may spread within a short time due to the internal structure of the battery and its components. It is difficult to extinguish a fire occurring in the battery of an eco-friendly vehicle by using an existing fire extinguishing device used in an internal combustion engine vehicle.

In an internal combustion engine vehicle, fuel, which is a flammable material, is used, and there are a number of heat sources, and various electric wiring is entangled, so the risk of fire always exists.

For example, since an engine room of the vehicle is equipped with a high-temperature engine and various electric devices, a fire may occur if the engine and the electric devices are damaged and if malfunction occurs due to a vehicle collision.

In addition, there is a risk of fire in the engine room during driving due to engine overheating or during exhaust gas post-treatment.

As a conventional fire extinguishing device in a vehicle, a r a fire extinguisher being provided is widely known. However, if a driver fails to use the fire extinguisher in time, initial fire extinguishing may fail and the fire may spread throughout the vehicle.

Moreover, public transportation vehicles such as buses have many passengers on board, so fire prevention management for passenger safety is essential, and the failure of an initial response to a fire may lead to injuries and/or fatalities.

In addition, since a driver is indoors while driving a vehicle, it is often impossible to notice a fire quickly before a large amount of smoke is generated when a fire occurs inside the engine room. Unlike a passenger car, a bus typically has an engine room located at the rear of the bus, so it is difficult for a driver to notice a fire occurring in the engine room of the bus.

Accordingly, in the early stage of a fire, a driver cannot perform rapid fire extinguishing, and the fire may spread, which may lead to burning of the vehicle and the increase of the risk of injury to passengers.

In addition, even when a driver or passenger inside the vehicle rapidly recognizes the occurrence of a fire, it is difficult to rapidly extinguish the fire in an early stage by using only a small fire extinguisher provided in the vehicle.

Accordingly, a fire extinguishing system is known in which a fire extinguishing agent is automatically sprayed toward an ignition point when an occurrence of a fire is detected in the engine room of a vehicle to rapidly extinguish the fire in an early stage.

In a known engine room fire extinguishing system, when a fire occurs in the engine room, a fire detection signal is transmitted thereto and high-pressure nitrogen charged in the nitrogen tank is supplied to a cylinder filled with a fire extinguishing agent through a hose.

Accordingly, in the cylinder, while a piston is operated by the high-pressure nitrogen, the internal fire extinguishing agent is supplied to an injection line at a high pressure by the pushing force of the piston, and eventually the fire extinguishing agent is sprayed to an ignition point through the nozzle of the injection line to extinguish the fire.

However, although the fire extinguishing system described above is useful for automatically extinguishing a fire by automatically spraying the fire extinguishing agent in a vehicle's engine room or other space in a vehicle, it is difficult to apply the system to extinguishing a fire occurring in a battery pack of an eco-friendly vehicle.

In general, in the case of a battery pack, it is virtually impossible to extinguish a fire by simply spraying water or a fire extinguishing agent thereto when a fire occurs.

The battery pack contains igniting substances in a closed inner space of the battery pack and battery cells constituting the battery pack contain substances having a large amount of oxygen inside. Accordingly, due to the oxygen remaining inside the battery pack, it is difficult to completely extinguish a fire by using water or spraying fire extinguishing agents (fire extinguishing powder or fire extinguishing liquid) such as those used in a conventional internal combustion engine vehicle when the fire occurs in the battery pack.

Accordingly, when a fire occurs in the battery of a vehicle, the fire may not be completely extinguished, and the fire may spread to the vehicle after a period of time.

Recently, as the use of eco-friendly vehicles has increased, the risk of fire has increased due to external shock or internal short circuit in the battery or surrounding high voltage electric wiring.

However, until now, there has been no technology to prevent a fire occurring in a battery from spreading throughout a vehicle, so there are dangers such as the burning of a vehicle or injury to passengers.

SUMMARY

Accordingly, the present disclosure proposes a technology that can prevent burning of a vehicle or human injury caused by a fire occurring in a battery.

To achieve the above objective, according to an embodiment of the present disclosure, there is provided a battery release system for a vehicle, the battery release system including a controller outputting a control signal to release a battery pack from a vehicle such that the battery pack is separated from the vehicle when the controller determines that a fire occurs in the battery pack, a mounting frame mounted to a vehicle body to support the battery pack, and a first locking device mounted to the mounting frame to lock the battery pack to the mounting frame such that the battery pack is held on the mounting frame, the first locking device being operated to release the locked state of the battery pack in response to the control signal of the controller such that the release of the battery pack is performed.

The battery release system for a vehicle according to the embodiment of the present disclosure may further include a fire detection sensor detecting a fire occurring in the battery pack, wherein the controller is provided to determine whether a fire occurs in the battery pack on the basis of a signal of the fire detection sensor.

In addition, the battery release system for a vehicle according to the embodiment of the present disclosure may further include a manipulating device provided to be manipulated by a user to release the battery pack, and a second locking device mounted to the mounting frame to lock the battery pack to the mounting frame such that the battery pack is held on the mounting frame, the second locking device being operated to release the locked state of the battery pack according to the manipulation of the manipulating device by the user due to connection of the second locking device to the manipulating device.

Additionally, the battery release system for a vehicle according to the embodiment of the present disclosure may further include a notification device operated by the controller to notify the user of a fire occurring in the battery pack.

Furthermore, the manipulating device may include a release lever provided to be manipulated by the user, and a release cable connected between the release lever and the second locking device to transmit a manipulation force of the user from the release lever to the second locking device.

In addition, the mounting frame may include a base frame supporting a lower part of the battery pack while being combined with the lower part of the battery pack via the first locking device, and an upper frame combined with the base frame and supporting the battery pack at an upper side of the battery pack while being combined with the battery pack via the second locking device.

Additionally, the base frame may include a pair of subframes provided to support the lower part of the battery pack at opposite sides of the battery pack, each of the subframes being configured to support the lower part of each of opposite end parts of the battery pack located in a longitudinal direction of the battery pack via the first locking device.

Furthermore, the first locking device may include a hook holding and locking a holding jaw part provided on the lower part of the battery pack, and an actuator fixedly mounted to each of the subframes, with the actuator connected to the hook, and forcibly rotating the hook maintaining the locked state of the holding jaw part to a position of the hook by which the locked state of the holding jaw part is released in response to the control signal output from the controller.

Additionally, the second locking device may include a first coupler fixedly mounted to an upper surface of the battery pack, a second coupler fixedly mounted to the mounting frame, and a clamp clamping and engaging the first coupler and the second coupler with each other and releasing the engaged state between the first coupler and the second coupler by using a manipulation force of a user transmitted from the manipulating device.

In addition, the first coupler may include a base plate fixed to the upper surface of the battery pack, a column provided on the base plate by extending upwards from the base plate, and a joining plate provided on an upper part of the column, the joining plate having a shape of a disc extending in a radial direction of the disc, and the second coupler may include a base plate fixed to the mounting frame, a column provided on the base plate by extending downwards from the base plate, and a joining plate provided on a lower part of the column, the joining plate having a shape of a disc extending in a radial direction of the disc, wherein the joining plate of the first coupler and the joining plate of the second coupler may be engaged with each other by the clamp while being joined to each other.

Furthermore, a coupling groove may be provided in one of the joining plate of the first coupler and the joining plate of the second coupler, and a coupling protrusion may be provided on the remaining one of the two joining plates to be inserted into the coupling groove.

Additionally, the clamp may include two subblocks configured to have semicircular shapes and engaging the joining plate of the first coupler and the joining plate of the second coupler with each other while the two subblocks are combined with each other to have a circular ring shape, a hinge part rotatably coupling end parts of the two subblocks to each other, and having a spring provided therein, the spring providing an elastic restoring force for rotating the two subblocks in directions opening the subblocks such that the engaged state of the two joining plates is released, and an engaging pin coupled to the two subblocks by passing through the two subblocks such that the two subblocks are maintained in a state of being combined with each other, wherein the engaging pin may be separated from the two subblocks by a manipulation force of a user transmitted from the manipulating device due to connection of the engaging pin to the manipulating device, so that the two subblocks may be rotated in the opening directions by the spring.

In addition, a receiving groove may be provided in an inner circumferential surface of each of the subblocks such that the two joining plates joined to each other are inserted into the receiving groove.

Furthermore, the first locking device may include the hook holding and locking the holding jaw part provided on the lower part of the battery pack, and the actuator fixedly mounted to the mounting frame and forcibly rotating the hook maintaining the locked state of the holding jaw part by using the control signal output from the controller to a position of the hook by which the locked state of the holding jaw part is released.

Additionally, when the controller determines that the vehicle is in a stopped state while the controller determines that a fire occurs in the battery pack, the controller may be set to output the control signal to release the battery pack from the vehicle such that the battery pack is separated from the vehicle.

Accordingly, according to the battery release system for a vehicle of the present disclosure, a battery, in which a fire occurs, can be released from a vehicle to be separated and removed from the vehicle, so the fire occurring in the battery can be prevented from spreading to the vehicle and the vehicle and a driver can be thus safely protected from the battery fire.

BRIEF DESCRIPTION OF THE DRAWINGS

The above and other objects, features, and other advantages of the present disclosure will be more clearly under

DETAILED DESCRIPTION OF THE DISCLOSURE

Figure 1:
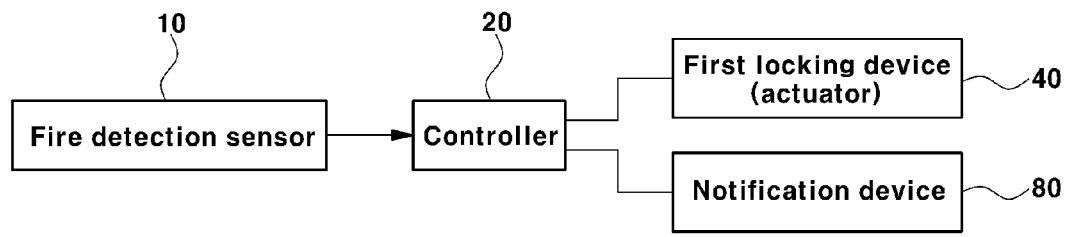
- FIG. 1 is a block diagram illustrating the main configuration of a battery release system according to an embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g., fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the disclosure. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Throughout the specification, unless explicitly described to the contrary, the word "comprise" and variations such as "comprises" or "comprising" will be understood to imply the inclusion of stated elements but not the exclusion of any other elements. In addition, the terms "unit", "-er", "-or", and "module" described in the specification mean units for processing at least one function and operation, and can be implemented by hardware components or software components and combinations thereof.

Further, the control logic of the present disclosure may be embodied as non-transitory computer readable media on a computer readable medium containing executable program instructions executed by a processor, controller or the like. Examples of computer readable media include, but are not limited to, ROM, RAM, compact disc (CD)-ROMs, magnetic tapes, floppy disks, flash drives, smart cards and optical data storage devices. The computer readable medium can also be distributed in network coupled computer systems so that the computer readable media is stored and executed in a distributed fashion, e.g., by a telematics server or a Controller Area Network (CAN).

Herein below, reference will now be made in greater detail to an exemplary embodiment of the present disclosure, an example of which is illustrated in the accompanying drawings such that those skilled in the art can efficiently perform the embodiment of the present disclosure.

However, the present disclosure is not limited to the embodiment thereof and may be variously realized.

The present disclosure proposes a technology that can prevent burning of a vehicle or human injury caused by a fire in a battery mounted on an eco-friendly vehicle.

As described above, in the event of a fire in a battery pack 1 in an eco-friendly vehicle, extinguishing a fire by spraying a fire extinguishing agent into an ignition part has a limitation.

Accordingly, to prevent the spread of fire to a vehicle, a method of separating the ignition part from the vehicle may be considered, and the separation of the ignition part from the vehicle can protect the vehicle and a driver from the fire.

When a fire occurs in a battery pack in a vehicle, the battery pack is automatically released from the vehicle so that the battery pack can be separated and removed from the vehicle.

To this end, the present disclosure relates to a system that can release a battery from a vehicle such that the battery can be separated and removed from the vehicle when a fire occurs in the battery. The system is operated in response to the control signal of a controller detecting a fire in a battery and by the manipulation of a driver, and releases the state of the battery mounted to a vehicle body to release the battery from the vehicle body such that the battery can be separated or removed from a vehicle.

In the present disclosure, the battery may refer to a battery in a pack unit, that is, a battery pack.

In addition, the present disclosure can be applied to eco-friendly vehicles. Specifically, although the present disclosure can be applied to general passenger vehicles, it is useful when the present disclosure is applied to commercial vehicles, especially battery electric trucks and battery electric buses, and hydrogen electric trucks and hydrogen electric buses equipped with fuel cells.

In the case of a truck or a bus, since a vehicle body is large, the battery pack 1 may be mounted to the vehicle body exposed to the outside without being mounted inside the vehicle. Accordingly, when the battery release system of the present disclosure is applied, it is possible to release the battery pack 1 in which a fire occurs from the vehicle so that the battery pack 1 is separated and removed from the vehicle.

Moreover, in the case of buses with many passengers on board, the failure of initial fire extinguishing may lead to many human injuries. Thus, when there is difficulty in the initial fire extinguishing, separating a battery from a vehicle such that a fire is prevented from spreading from the battery to the vehicle may be more effective in preventing the occurrence of major catastrophes than extinguishing the fire of the battery.

Moreover, when initial fire extinguishing fails in the case of a bus with a large number of passengers, many casualties may occur. Accordingly, when there is difficulty in the initial fire extinguishing, separating the battery from the vehicle such that the fire is prevented from spreading to the vehicle may be more effective in preventing the occurrence of many casualties than extinguishing the fire of the battery.

That is, since the battery, which may be the source of a fire of a vehicle, can be separated from the vehicle, it is possible to reliably prevent a more dangerous situation, such as the burning of a vehicle or human injury.

Hereinafter, the configuration of a battery release system according to the embodiment of the present disclosure will be described in detail with reference to the accompanying drawings.

Figure 2:
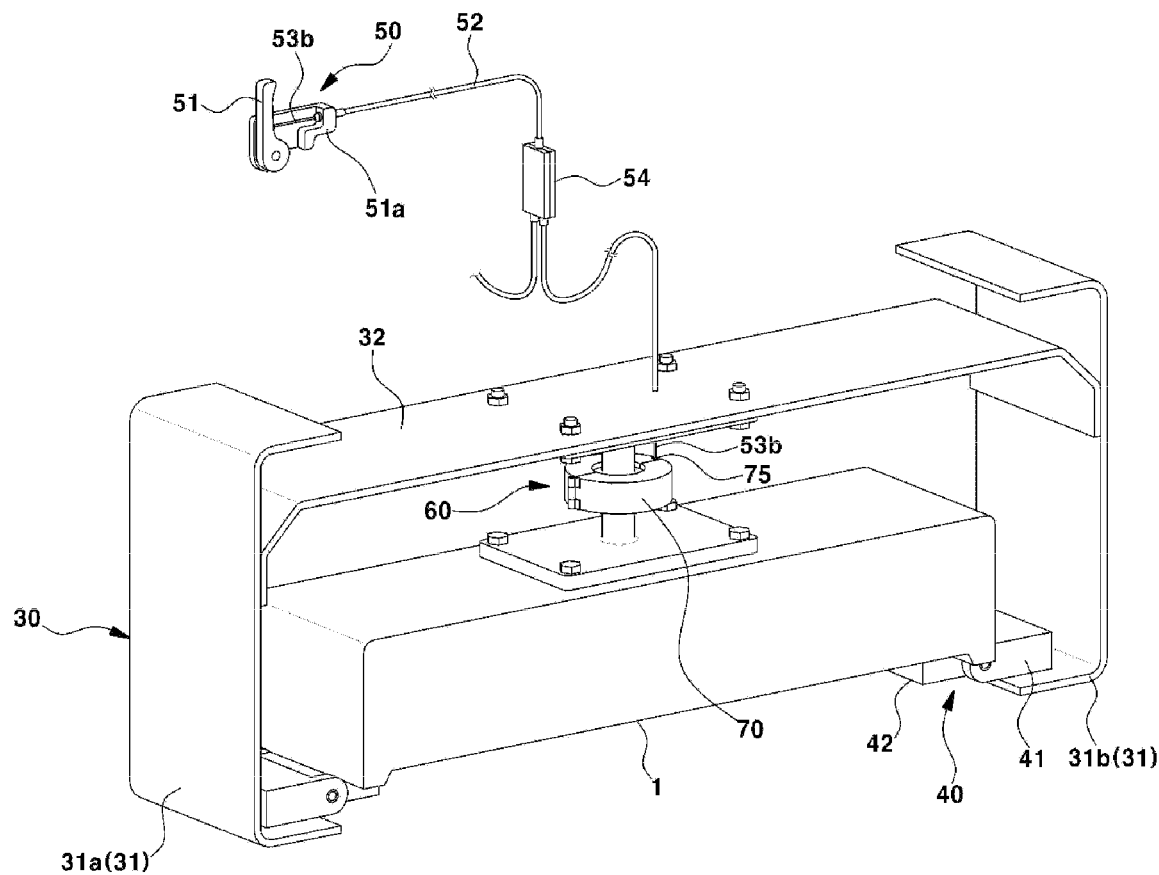
FIG. 2 is a perspective view illustrating the battery release system according to the embodiment of the present disclosure.

FIG. 1 is a block diagram illustrating the main configuration of the battery release system according to the embodiment of the present disclosure, and FIG. 2 is a perspective view illustrating the battery release system according to the embodiment of the present disclosure.

Figure 3:
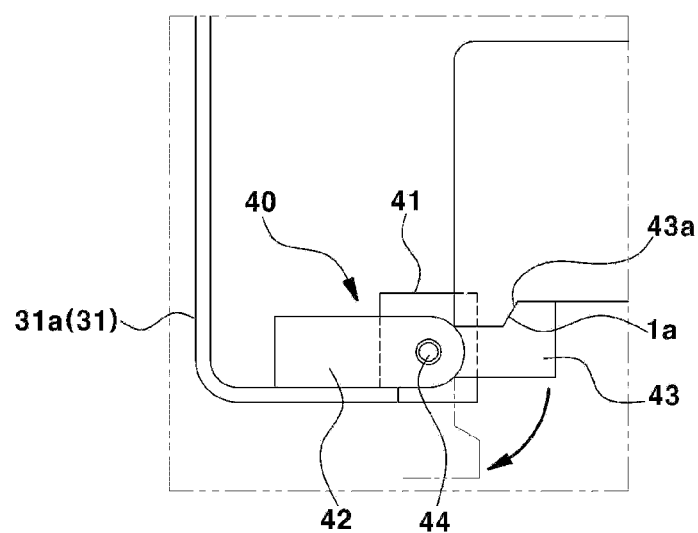
FIG. 3 is a side view illustrating the operation state of a first locking device in the battery release system according to the embodiment of the present disclosure.
Figure 4:
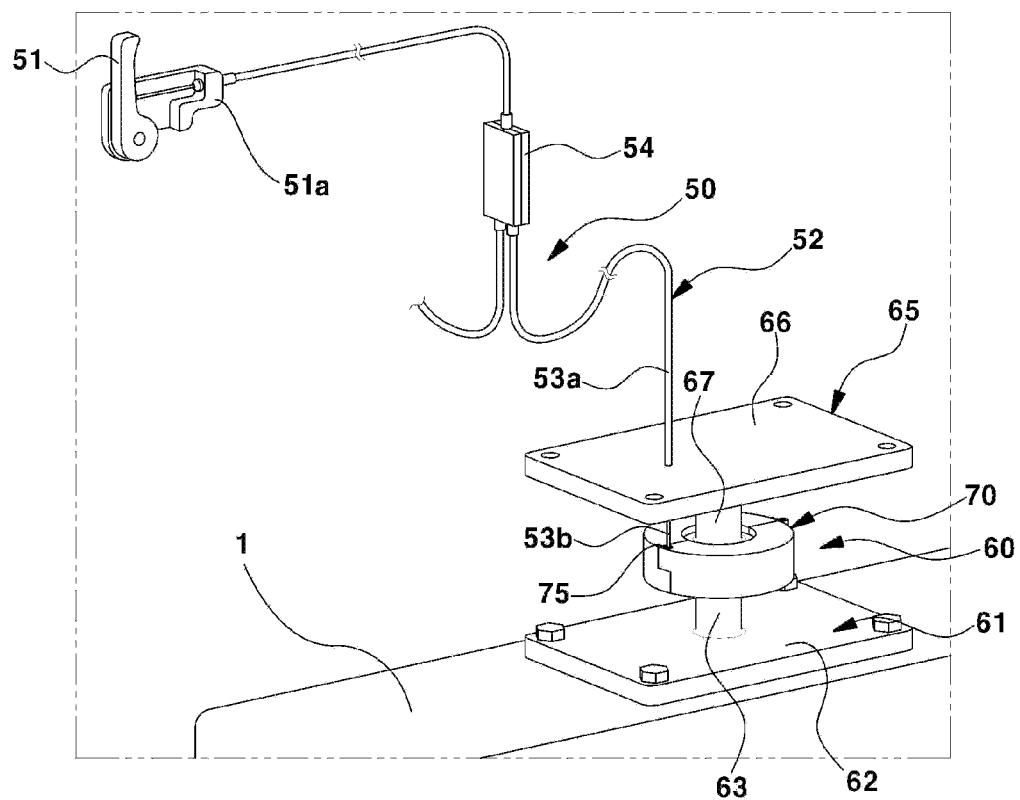
FIG. 4 is a perspective view illustrating the configuration of a manipulating device and a second locking device in the battery release system according to the embodiment of the present disclosure.

FIG. 3 is a side view illustrating the operation state of a first locking device 40 in the battery release system according to the embodiment of the present disclosure, and FIG. 4 is a perspective view illustrating the configuration of a manipulating device 50 and a second locking device 60 in the battery release system according to the embodiment of the present disclosure;

In FIG. 4, the illustration of an upper frame of a mounting frame is omitted.

In addition, in FIG. 4, the state of the battery pack 1 locked by the second locking device 60 is illustrated, and the state of a release cable 52 of the manipulating device 50 connected to an engaging pin 75 of a clamp 70 with the release cable 52 passing through a base plate 66 of a second coupler 65 is illustrated.

Figure 5:
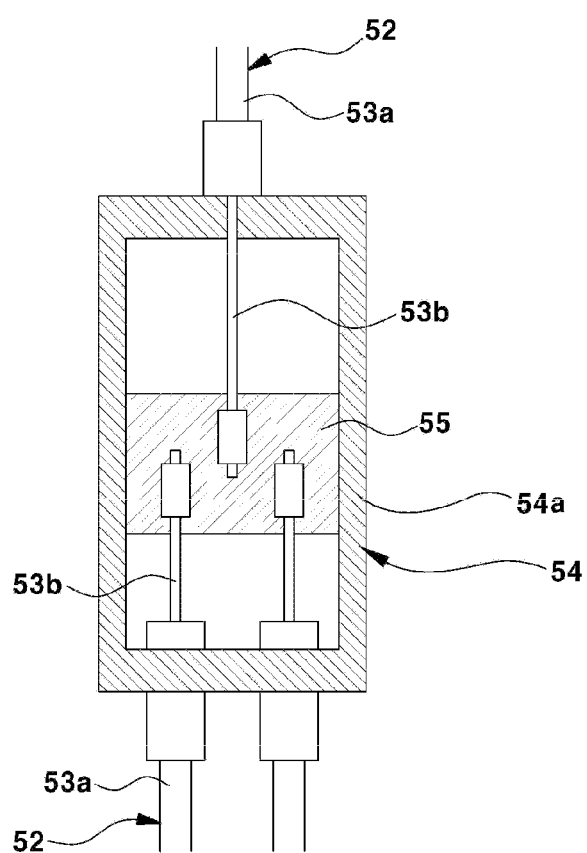
FIG. 5 is a view illustrating a release cable and a multi cable box of the manipulating device in the battery release system according to the embodiment of the present disclosure.

FIG. 5 is a view illustrating the release cable 52 and a multi cable box 54 of the manipulating device in the battery release system according to the embodiment of the present disclosure, and the section of the multi cable box 54 is illustrated to show an inner configuration thereof.

Figure 6:
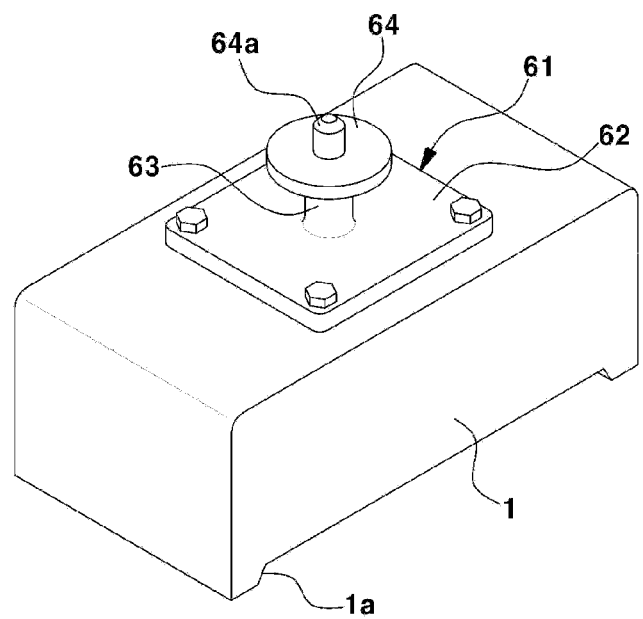
FIG. 6 is a perspective view illustrating a first coupler of the second locking device in the battery release system according to the embodiment of the present disclosure.

FIG. 6 is a perspective view illustrating the state of a first coupler 61 of the second locking device coupled to an upper surface of the battery pack 1 in the battery release system according to the embodiment of the present disclosure.

Figure 7:
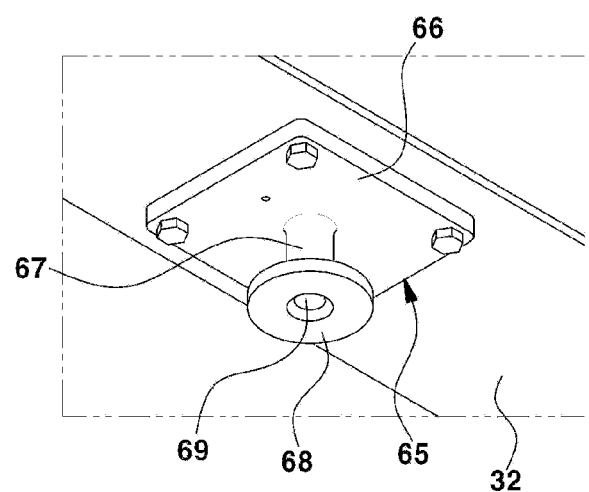
FIG. 7 is a perspective view illustrating a second coupler of the second locking device in the battery release system according to the embodiment of the present disclosure.

FIG. 7 is a perspective view illustrating the second coupler 65 of the second locking device mounted to the upper frame 32 of the mounting frame in the battery release system according to the embodiment of the present disclosure.

Figure 8:
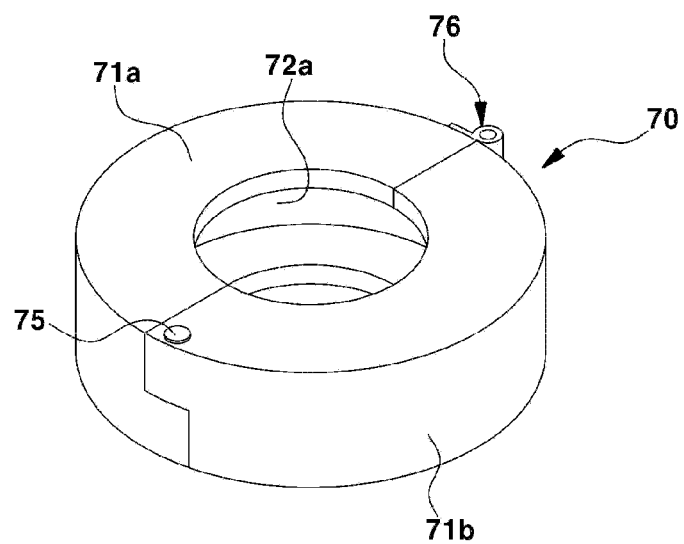
FIGS. 8 and 9 are perspective views illustrating a clamp of the second locking device in the battery release system according to the embodiment of the present disclosure.
Figure 9:
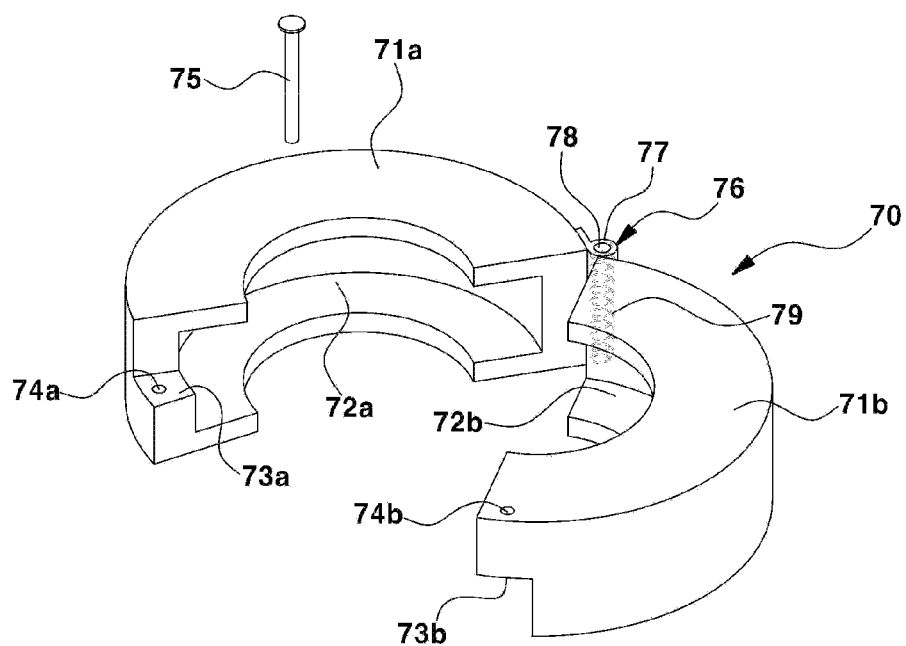

FIGS. 8 and 9 are perspective views illustrating the clamp 70 of the second locking device in the battery release system according to the embodiment of the present disclosure. FIG. 8 illustrates the state of two subblocks 71a and 71b constituting the clamp 70 combined with each other in a circular shape to be engaged with each other by the engaging pin 75, and FIG. 9 illustrates the state of the two subblocks 71a and 71b opened by an elastic restoring force of a spring 79.

Figure 10:
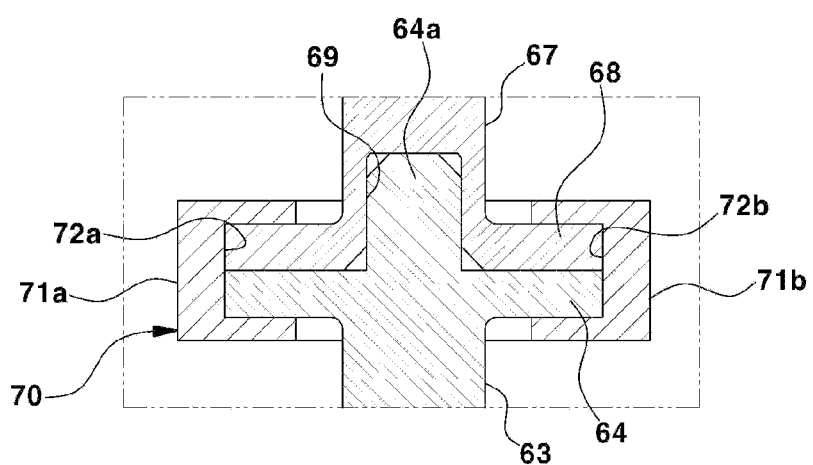
FIG. 10 is a sectional view illustrating the clamp of the second locking device in the battery release system according to the embodiment of the present disclosure.

FIG. 10 is a sectional view illustrating the clamp 70 of the second locking device in the battery release system according to the embodiment of the present disclosure, and is the sectional view illustrating the state of a joining plate 68 of the second coupler and a joining plate 64 of the first coupler engaged with each other by the clamp 70, with the joining plate 68 and the joining plate 64 combined with each other.

The battery release system according to the present disclosure is configured to integrally perform the function of mounting the battery pack 1 to the vehicle body and the function of releasing the mounting of the battery pack 1 to the body frame 2 and removing the battery pack 1 from a vehicle frame to separate and remove the battery pack 1 from a vehicle.

As for the configuration of the battery release system, the battery release system according to the present disclosure includes the controller 20 determining whether a fire occurs in the battery pack 1; the mounting frame 30 mounted to the vehicle body to support and mount the battery pack 1 thereto; and the first locking device 40 mounted to the mounting frame 30, the first locking device operated to lock the battery pack 1 to the mounting frame such that the battery pack is held on the mounting frame and to release the locked state of the battery pack 1 in response to the control signal of the controller 20 such that the release of the battery pack 1 is performed.

In addition, the battery release system according to the present disclosure may further include a fire detection sensor 10 detecting the fire of the battery pack 1, and a notification device 80 operated by the controller 20 to notify the occurrence of a fire in the battery pack 1.

In addition, the battery release system according to the present disclosure may further include the manipulating device 50 provided to be manipulated by a user for the release of the battery pack 1, and the second locking device 60 mounted to the mounting frame 30 to lock the battery pack 1 to the mounting frame such that the battery pack is held on the mounting frame, and releasing the locked state of the battery pack 1 according to the manipulation of the manipulating device 50 by a user due to connection of the second locking device 60 to the manipulating device 50.

In the embodiment of the present disclosure, the manipulating device 50 may include a lever 51 (hereinafter, referred to as "a release lever") provided to be manipulated by a user, and a power transmission means transmitting a manipulation force of the user from the release lever 51 to the second locking device 60.

In the embodiment of the present disclosure, the power transmission means may be a cable (hereinafter, referred to as "a release cable") connected between the release lever 51 and the second locking device 60.

Accordingly, the first locking device 40 is a device that electrically releases the locked state of the battery pack 1, and particularly, is operated to release the locked state of the battery pack 1 by the control of the controller 20 detecting a fire.

On the other hand, the second locking device 60 is a device that allows the locked state of the battery pack 1 to be manually released by the manipulation of a user (for example, a driver), and is operated to allow the locked state of the battery pack 1 to be released by the manipulating device 50 when a user manipulates the manipulating device 50 to separate the battery pack 1 from a vehicle after recognizing the occurrence of a fire.

In the embodiment of the present disclosure, the first locking device 40 and the second locking device 60 are coupled to the battery pack 1 in the mounting frame 30, and are components that lock the battery pack 1 to the mounting frame, and at the same time, hold and support the battery pack 1 on a vehicle via the mounting frame in the locked state of the battery pack.

In addition, the first locking device 40 and the second locking device 60 are components separated from the battery pack 1 such the battery pack 1 is released from the mounting frame during the release of the locked state of the battery pack 1. The state of the battery pack 1 locked to the mounting frame 30 can be completely released, and the battery pack 1 can be separated from the mounting frame 30 to be released from the mounting frame 30 only when both the first locking device 40 and the second locking device 60 release the locked state of the battery pack 1.

In the embodiment of the present disclosure, the release of the battery pack 1 indicates that the battery pack is separated from a vehicle by falling from the mounting frame 30 due to weight of the battery pack such that a fire is prevented from spreading to the vehicle.

Furthermore, releasing the locked state of the battery pack 1 by the first locking device 40 and the second locking device 60 indicates that elements which may interfere with the free fall of the battery pack 1 of the configuration of the present disclosure as well as the configuration of the first locking device 40 and the second locking device 60 are all removed from the battery pack 1.

Referring to FIG. 1, the fire detection sensor 10 detecting a fire in the battery pack 1; the controller 20 determining whether the battery pack 1 has a fire by receiving the signal of the fire detection sensor 10; an actuator 41 of the first locking device 40 operating in response to the control signal of the controller 20; and the notification device 80 operated by the controller 20 are illustrated.

In the embodiment of the present disclosure, the fire detection sensor 10 may be a temperature sensor that measures the temperature of the battery pack 1 and outputs a signal according to the measured value.

The fire detection sensor 10 is connected to the controller 20 so as to transmit a signal thereto, and the controller 20 may receive the signal output from the fire detection sensor 10 and determine whether the battery pack 1 has a fire on the basis of the temperature of the battery pack indicated by the signal.

In the embodiment of the present disclosure, the controller 20 may be set to determine that the battery pack 1 has a fire when the temperature of the battery pack measured by the fire detection sensor 10 is at least a preset reference temperature.

In addition, when the controller 20 determines that a fire has occurred in the battery pack 1, the controller 20 outputs the control signal for the release of the battery pack, and the actuator 41 of the first locking device 40 performs operation for the release of the battery pack in response to the control signal of the controller 20.

In addition, when the controller 20 determines that the battery pack has a fire on the basis of the signal of the fire detection sensor 10, and when a vehicle speed is less than or equal to a reference speed, the controller 20 may be set to output the control signal for the release of the battery pack.

In this case, the reference speed may be determined as stationary vehicle speed at which a vehicle can be determined to be in a stopped state, for example, 0 km/h. Accordingly, in the case of the fire detected state of the battery pack and the stopped state of a vehicle, release of the battery pack 1 may be performed.

In addition, when the controller 20 determines that a fire occurs in the battery pack 1, the controller 20 operates the notification device 80 and notifies a user (a driver) of the fire occurrence of the battery pack 1, with the state of the battery pack being locked by the first locking device 40, so that the user can recognize the fire occurrence of the battery pack 1.

Next, the user determines whether to actually release the battery pack 1, and when the user finally determines to release the battery pack 1, the user manipulates the manipulating device 50 to further release the state of the battery pack locked by the second locking device 60.

Finally, when the locking performed by the first locking device 40 and the second locking device 60 is released, the battery pack 1 is released from the mounting frame 30 and is separated from a vehicle.

In the embodiment of the present disclosure, the notification device 80 may be one of a sound output device, a display device, or a lamp mounted to a vehicle, which provides a notification of a fire occurrence in response to the control signal output from the controller 20.

Here, the sound output device may be a buzzer installed in the interior or exterior of a vehicle, the display device may be a display installed in a cluster or an in-vehicle display, for example, an AVN display, and the lamp may be a warning lamp installed in the cluster or in the interior or exterior of a vehicle.

In the embodiment of the present disclosure, the mounting frame 30 is a structure to which the battery pack 1 is mounted in a vehicle, and may be a portion of the vehicle body, or may be a frame fixed to and combined with a side of the vehicle body after being separately manufactured to be separated from the vehicle body.

In the drawings, the vehicle body except for the mounting frame 30 is not illustrated. The mounting frame 30 may be installed at a position of the vehicle body from which the battery pack 1 reaches the ground without interruption of obstacles when the battery pack 1 is vertically fallen by weight due to the release of the locking performed by the first locking device 40 and the second locking device 60, and the position may be set as the mounting position of the battery pack.

For example, as for a truck, the mounting frame 30 may be mounted and fixed to a side surface of a vehicle body frame, which is longitudinally arranged toward the front and rear of a vehicle, in a lower part of the vehicle body.

In the embodiment of the present disclosure, the mounting frame 30 may include a base frame 31 supporting a lower part of the battery pack 1, and the upper frame 32 supporting the battery pack 1 at an upper side of the battery pack, wherein the base frame 31 and the upper frame 32 may be combined with each other to form an integral frame.

In the locked state of the battery pack 1, the base frame 31 is combined with the lower part of the battery pack 1 by the first locking device 40 to support the lower part of the battery pack 1.

In the embodiment of the present disclosure, the battery pack 1 may be supported by the base frame 31, with the lower part of the battery pack 1 seated on the first locking device 40, that is, with the battery pack 1 loaded on the first locking device 40.

In the locked state of the battery pack 1, the upper frame 32 is combined with an upper part of the battery pack 1 by the second locking device 60, and the battery pack 1 may be supported by the upper frame 32, with the battery pack 1 hung on the upper frame 32 via the second locking device 60.

As illustrated in FIG. 2, the base frame 31 may be include a pair of subframes 31*a* and 31*b* provided to support the lower part of the battery pack 1 at opposite sides of the battery pack, wherein each of the subframes 31*a* and 31*b* is provided to have a "U" shape and the first locking device 40 is provided at a lower end part thereof.

In addition, the lower end part of each of the subframes 31*a* and 31*b* is configured to support the lower part of the battery pack 1 via the first locking device 40. Particularly, each of the two subframes 31*a* and 31*b* located at the opposite sides of the battery pack 1 may be provided to support the lower part of each of the opposite end parts of the battery pack 1 located in a longitudinal direction of the battery pack via the first locking device 40.

To this end, the battery release system according to the present disclosure has a pair of first locking devices 40, the locking performed by which is simultaneously released in response to the control signal of the controller 20 as illustrated in FIG. 2, and each of the first locking devices 40 is provided to support each of the lower end parts of the battery pack 1 located in the longitudinal direction of the battery pack, with each of the first locking devices 40 installed on lower end parts of the corresponding subframes 31a and 31b.

The upper frame 32 may be a frame having a plate shape arranged horizontally to connect the pair of subframes 31a and 31b to each other, and opposite end parts of the upper frame 32 may be fixed integrally to the subframes 31a and 31b.

Accordingly, a space having a predetermined height is provided from the upper frame 32 to a lower end part of the base frame 31, and the battery pack 1 is located in the space to be mounted. In this case, the upper frame 32 may be coupled to a middle portion of the upper surface of the battery pack 1 in the upper part of the battery pack via the second locking device 60 (see FIG. 2).

The first locking device 40 is mounted to each of the subframes 31a and 31b of the base frame 31. Particularly, the first locking device 40 is rotatably mounted to the lower end part of each of the subframes 31a and 31b as illustrated in FIG. 3, and may include a hook 43 holding and locking a holding jaw part 1a of the lower part of the battery pack 1, and the actuator 41 fixedly mounted to each of the subframes 31a and 31b and forcibly rotating the hook 43 maintaining the locked state of the holding jaw part 1a to a position of the hook by which the locked state of the holding jaw part is released.

Here, the hook 43 has a hinge pin 44 provided integrally thereto, and is rotatably coupled to a block 42, which is fixedly mounted to the lower end part of each of the subframes 31a and 31b, via the hinge pin 44.

In the embodiment of the present disclosure, the actuator 41 may be a motor, the driving of which is controlled in response to the control signal of the controller 20. Particularly, the actuator 41 may be a servo motor.

In this case, a drive shaft of the motor 41 is connected to the hinge pin 44 of the hook 43, and during the driving of the motor 41, a rotational force of the motor is transmitted to the hinge pin 44 of the hook 43 via the drive shaft, so that the hook 53 can be rotated.

The motor 41 is driven by the controller 20 detecting a fire occurring in the battery pack 1, and forcibly rotates the hook 43 in an unlocking direction of the hook. Accordingly, the state of the battery pack 1 locked by the first locking device 40 is released.

In the present disclosure, the base frame 31 includes the pair of subframes 31a and 31b, and in this case, each of the two subframes 31a and 31b is required to individually support and lock the battery pack 1. Accordingly, each of the first locking devices 40 having the same configuration is mounted to the two subframes 31a and 31b.

In addition, the two first locking devices 40 mounted to each of the subframes 31a and 31b are simultaneously operated to unlock the battery pack 1 in response to the control signal output from the controller 20.

Next, the configuration of the manipulating device 50 and the second locking device 60 will be described referring to FIGS. 4 to 10.

The manipulating device 50 is provided to be manipulated by a user such as a driver for the release of the battery pack 1. To release the battery pack 1, after the state of the battery pack locked by the first locking device 40 is automatically released by the controller 20 detecting a fire occurring in the battery pack, the user recognizes the fire of the battery pack through the notification device 80 and releases the state of the battery pack locked by the second locking device 60 by manipulating the manipulating device 50.

In the present disclosure, both the first locking device 40 and the second locking device 60 are devices locking the battery pack 1 to the mounting frame 30 such that the battery pack 1 is held on the mounting frame. Accordingly, the locked state of the battery pack 1 is completely released and the release of the battery pack can be performed only when the state of the battery pack 1 locked by the first locking device 40 is released and then the state of the battery pack 1 locked by the second locking device 60 is also released.

In the embodiment of the present disclosure, the manipulating device 50 may include the release lever 51 provided in a side of a vehicle to be manipulated by a user, and the power transmission means transmitting the manipulation force of the user from the release lever 51 to the second locking device 60.

Here, the power transmission means may be the release cable 52 connected between the release lever 51 and the second locking device 60.

The release lever 51 may be provided at a predetermined position in a vehicle such as a driver's seat, and is rotatably mounted to the lever housing 51a fixed to the vehicle.

In addition, the release cable 52 may be connected from the release lever 51 via the multi cable box 54 to the second locking device 60, and may include a tube 53a provided to be connected between fixed elements located in the path of the release cable, and wire 53b provided to move along the inside of the tube 53a, a first end part of which is connected to the release lever 51, and a second end part of which is connected to the second locking device 60 such that the wire is pulled in cooperation with the rotation operation of the release lever 51.

As illustrated in FIGS. 4 and 5, the tube 53a of the release lever 51 is provided to be connected between a lever housing 51a and a case 54a of the multi cable box 54 and between the case 54a of the multi cable box 54 and the second coupler 65 of the second locking device 60.

In this case, the wire 53b provided by being inserted to the inside of the tube 53a is provided to be connected between the release lever 51 and a connecting plate 55 inside the multi cable box 54, and between the connecting plate 55 inside the multi cable box 54 and the clamp 70 of the second locking device 60.

More particularly, with the wire 53b passing through the base plate 66 of the second coupler 65, the wire 53b extends to the clamp 70 of a lower side of the base plate 66 and is connected to the engaging pin 75 of the clamp 70.

Here, the lever housing 51a, the case 54a of the multi cable box 54, and the second coupler 65 of the second locking device 60 are all fixed elements fixedly mounted to a vehicle so as not to move and operate.

The multi cable box 54 is provided to divide the release cable 52 connected to one release lever 51 into a plurality of release cables. In the embodiment of the present disclosure, the battery release system having the same configuration can be applied to a plurality of battery packs 1, and in this case, the release lever 51 can be commonly used. In this case, to connect the release cable 52 between one release lever 51 and a plurality of the second locking devices 60, the release cable 52 may be divided into the release cables 52 by the multi cable box 54, and the release cables 52 may be connected to the plurality of the second locking devices 60.

Accordingly, when a user manipulates the release lever 51, the plurality of the second locking devices 60 connected to release cables 52 to which the release cable 52 is divided by the multi cable box 54 are simultaneously operated to unlock a plurality of battery packs 1.

Accordingly, the plurality of battery packs 1 can be simultaneously unlocked and released from the mounting frame.

Referring to FIGS. 4 and 5, an example in which one release cable 52 connected to the release lever 51 is divided into two release cables 52 by the multi cable box 54 is seen.

Accordingly, when one release lever 51 is manipulated, the locking performed by two second locking devices 60 is simultaneously released and two battery packs 1 can be simultaneously unlocked and released from the mounting frame.

Referring to FIG. 5, the connecting plate 55 is provided to move upwards and downwards inside the case 54a of the multi cable box 54, and one release cable 52 connected to the release lever 51 is connected to first sides of the case 54a of the multi cable box 54 and the connecting plate 55, and the two release cables 52 connected to the second locking devices 60 are connected to second sides of the case 54a of the multi cable box 54 and the connecting plate 55.

In addition, the tube 53a of each of the release cables 52 is connected to the case 54a of the multi cable box 54. In this case, the wire 53b inside the tube 53a of each of the release cables 52 is seen to be connected to the connecting plate 55.

When the release lever 51 is manipulated by being pulled, the wire 53b of the release cable 52, which is connected to an upper side of the connecting plate 55, is pulled and the connecting plate 55 is pulled upwards in FIG. 5. In this case, the wires 53b of the two release cables 52, which are connected to a lower side of the connecting plate 55, are simultaneously pulled.

Accordingly, the locking performed by the two second locking devices 60 connected to ends of the wires 53b of the release cables 52, which are located at the lower side of the connecting plate 55 in FIG. 5, is simultaneously released, and finally, two battery packs 1 are simultaneously unlocked and released from the mounting frame.

In FIGS. 4 and 5, the embodiment in which one release cable 52 is divided to two release cables 52 is illustrated, but this is for an illustrative purpose, and the present disclosure is not limited thereto. In consideration of the number of the battery pack 1 as a target, the release cable 52 may be divided into three or four release cables.

Furthermore, when a vehicle has many battery packs 1, the release lever 51 may also be provided in plural. In this case, after a driver checks the battery pack 1 in which a fire occurs, the driver pulls only a required release lever 51 of the plurality of release levers 51 to be manipulated such that the locked state of the battery pack 1 in which the fire occurs can be released.

Next, the second locking device 60, which is mounted to the upper frame 32 of the mounting frame 30, holds the battery pack 1 on the mounting frame by locking the battery pack 1, and unlocks the battery pack 1 during the manipulation of the manipulating device 50 by a user since the second locking device 60 is connected to the manipulating device 50.

In the embodiment of the present disclosure, the second locking device 60 may include the first coupler 61 fixedly mounted to the upper surface of the battery pack 1; the second coupler 65 fixedly mounted to the upper frame 32 of the mounting frame 30; the clamp 70 clamping and engaging the first coupler 61 and the second coupler 65 with each other and releasing the engaged state between the first coupler 61 and the second coupler 65 by using the manipulation force of a user transmitted from the manipulating device 50.

As illustrated in FIG. 4, the first coupler 61 may include a base plate 62 fixed to the upper surface of the battery pack 1 by being combined therewith; a column 63 provided on the base plate 62 by extending to protrude upwards from the base plate 62; and the joining plate 64 provided on an upper part of the column 63, the joining plate having the shape of a disc extending in a radial direction of the disc.

The second coupler 65 may include the base plate 66 fixed to a lower surface of the upper frame (a reference numeral "32" in FIG. 2) by being combined therewith; a column 67 provided on the base plate 66 by extending to protrude downwards from the base plate 66; and the joining plate 68 provided on a lower part of the column 67, the joining plate having the shape of a disc extending in a radial direction of the disc.

In the embodiment of the present disclosure, the base plate 62 of the first coupler 61 may be engaged with and fixed to the upper surface of the battery pack 1 by bolting, and the base plate 66 of the second coupler 65 may be engaged with and fixed to the lower surface of the upper frame 32 by bolting.

In the embodiment of the present disclosure, when the battery pack is mounted to the base frame 31 of the mounting frame 30 to be supported thereby during the mounting of the battery pack 1, the first coupler 61 provided on the battery pack 1 is combined with and engaged with the second coupler 65 mounted to the upper frame 32 of the mounting frame 30. In this case, as illustrated in FIG. 10, the joining plate 64 of the first coupler and the joining plate 68 of the second coupler are engaged with each other while being joined to each other.

That is, when the battery pack 1 is supported by the base frame 31, the joining plate 64 of the first coupler 61 mounted to the battery pack 1 is engaged with the joining plate 68 of the second coupler 65 mounted to the upper frame 32 by the clamp 70, with the joining plate 64 and the joining plate 68 joined to each other.

In the embodiment of the present disclosure, the joining plate 64 of the first coupler 61 and the joining plate 68 of the second coupler 65 joined to each other during the mounting of the battery pack 1 are combined with each other by a groove-protrusion structure, which allows the mounting of the battery pack 1 and the engagement performed by the clamp 70 to be easily performed.

That is, a coupling groove 69 is formed in one of the joining plate 64 of the first coupler 61 and the joining plate 68 of the second coupler 65, and a coupling protrusion 64a is formed on the remaining one of the two joining plates to be inserted into the coupling groove 69.

Referring to FIGS. 6, 7, and 10, the coupling groove 69 is formed in the joining plate 68 of the second coupler 65 mounted to the upper frame 32, and the coupling protrusion 64a is formed on the joining plate 64 of the first coupler 61 mounted to the battery pack 1.

Alternatively, the coupling groove may be formed in the joining plate 64 of the first coupler 61, and the coupling protrusion may be formed on the joining plate 68 of the second coupler 65.

The clamp 70 is provided to hold the joining plate 64 of the first coupler 61 and the joining plate 68 of the second coupler 65 joined to each other by covering the joining plate 64 and the joining plate 68, and is configured by including the two subblocks 71a and 71b, a hinge part 76, and the engaging pin 75, wherein the two subblocks 71a and 71b are hinged to each other by the hinge part 76.

In this case, the state of the two subblocks 71a and 71b clamped to each other is maintained by the engaging pin 75 between the first coupler 61 and the second coupler 65.

Each of the subblocks 71a and 71b of the clamp 70 may have a circular ring shape. In this case, the circular clamp 70 may be configured to include each of the two subblocks 71a and 71b having a semicircular shape, and an end part of each of the two subblocks 71a and 71b is configured to be rotatable relative to the hinge part 76.

When the joining plates 64 and 68 of the two couplers 61 and 65 having a circular shape are joined to each other at lower and upper positions, respectively, the two subblocks 71a and 71b are configured to cover the entirety of the two joining plates 64 and 68. Accordingly, the two joining plates 64 and 68 are combined integrally with each other and clamped to each other by the two subblocks 71a and 71b.

In the embodiment of the present disclosure, receiving grooves 72a and 72b are provided in inner circumferential surfaces of the subblocks 71a and 71b such that roughly a half portion of each of the two joining plates 64 and 68 joined to each other, that is, a semicircular portion of each of the two joining plates 64 and 68 can be received into each of the receiving grooves.

In addition, end parts of the subblocks opposite to end parts of the subblocks 71a and 71b hinged to each other in the subblocks 71a and 71b, that is, front end parts of the subblocks 71a and 71b have engaging parts 73a and 73b having stepped shapes formed therein. When the two subblocks 71a and 71b are rotated relative to the hinge part 76 and the clamp 70 forms a circular shape, the engaging parts 73a and 73b of the two subblocks 71a and 71b are configured to be combined with each other at lower and upper positions.

In the present disclosure, pin holes 74a and 74b are provided in the engaging parts 73a and 73b of each of the subblocks 71a and 71b by being formed therethrough. Here, the pin holes 74a and 74b are formed straightly through the two engaging parts 73a and 73b located at lower and upper sides when the two subblocks 71a and 71b are combined with each other such that the clamp 70 forms a circular shape, that is, when the engaging parts 73a and 73b of the two subblocks 71a and 71b are combined with each other.

The engaging pin 75 is inserted into the pin holes 74a and 74b such that the two engaging parts 73a and 73b engaged with each other are integrally combined with each other, and an end of the release cable 52 of the manipulating device 50 is connected to the engaging pin 75.

Accordingly, when a user pulls and rotates the release lever 51 of the manipulating device 50, the engaging pin 75 is pulled while the release cable 52 is pulled. Accordingly, the engaging pin 75 is removed from the pin holes 74a and 74b of the two subblocks 71a and 71b and the engaged state of the two subblocks 71a and 71b can be released.

In this case, the two subblocks 71a and 71b are opened while being rotated by the elastic restoring force of the spring 79 provided in the hinge part 76. In this case, the two joining plates 64 and 68 inserted into the receiving grooves 72a and 72b of the two subblocks 71a and 71b are removed from the receiving grooves 72a and 72b, and the engaged state between the two joining plates 64 and 68, and further, the engaged state between the first coupler 61 and the second coupler 65 are released.

Accordingly, when the engaged state between the two couplers 61 and 65 is released by the clamp 70, the state of the battery pack 1 locked by the second locking device 60 is released. Finally, the first coupler 61 mounted to the battery pack 1 is in a state of being separated from the second coupler 65 mounted to the upper frame 32 of the mounting frame 30. Next, the battery pack 1 falls by weight, and the release of the battery pack can be performed.

In the embodiment of the present disclosure, the hinge part 76 may be a known hinge rotatably coupled between the two subblocks 71a and 71b of the clamp 70.

In this case, the hinge part 76 may be a hinge having the spring 79 provided therein. The spring 79 is in a transformed state when the two subblocks 71a and 71b engage the two joining plates 64 and 68 with each other by being formed in a circular shape. Next, when the engaging pin 75 is removed from the pin holes 74a and 74b, the spring 79 provides the elastic restoring force required to rotate the two subblocks 71a and 71b in directions opening the two subblocks 71a and 71b.

That is, the hinge part 76 may be configured by including a hinge case 77, a hinge pin 78, and the spring 79. In this case, the hinge case 77 is configured by being divided into two parts formed integrally to the two subblocks 71a and 71b, and the hinge pin 78 is inserted between the two parts of the hinge case 77 to combine the two parts with each other.

In addition, the spring 79 may be provided between the two subblocks 71a and 71b, or between the divided two parts of the hinge case 77. When the engaging parts 73a and 73b of the two subblocks 71a and 71b are engaged with each other by the engaging pin 75, with the engaging parts 73a and 73b of the two subblocks 71a and 71b combined with each other, the spring 79 is transformed into a compressed state, and then when the engaging pin 75 is removed from the pin holes 74a and 74b of the engaging parts 73a and 73b, the elastic restoring force is applied to the two subblocks 71a and 71b and the two subblocks 71a and 71b are rotated in the opening directions.

Accordingly, the configuration of the battery release system according to the embodiment of the present disclosure has been described. Although the operation state of the battery release system has been described together with the configuration above, the operation state will be summarized again hereinbelow.

First, the controller 20 detects the fire occurrence of the battery pack 1 by using the signal of the fire detection sensor 10, and outputs the control signal for removing the battery pack 1 from a vehicle when the vehicle stops.

Next, the servo motor 41, which is the actuator of the first locking device 40, is driven in response to the control signal of the controller 20 and forcibly rotates the hook 43 downwards. Next, the state of the battery pack 1 locked by the first locking device 40 is released.

At the same time, the controller 20 operates the notification device 80 and notifies that a fire occurs in the battery pack 1, and after a user (for example, a driver) recognizes the fire occurrence of the battery pack 1 through the notification device 80, the user manipulates the manipulating device 50 to perform the release of the battery pack 1.

In this case, the user manipulates the release lever 51 by pulling the release lever 51, and the wire 53b of the release cable 52 is pulled by the rotation of the release lever 51.

Accordingly, when the release cable 52 is pulled, the engaging pin 75 engaging the two subblocks 71a and 71b with each other in the clamp 70 of the second locking device 60 is pulled upwards.

In this case, the engaging pin 75 is removed from the pin holes 74a and 74b formed in the subblocks 71a and 71b of the clamp 70, and is separated from the two subblocks 71a and 71b. Accordingly, the subblocks 71a and 71b are rotated in the opening directions by the elastic restoring force of the spring 79 inside the hinge part 76.

Accordingly, the joining plate 64 of the first coupler 61 and the joining plate 68 of the second coupler 65 are simultaneously removed from the receiving grooves 72a and 72b of the two subblocks 71a and 71b, and the clamped and engaged state between the first coupler 61 and the second coupler 65 by the clamp 70 is released. Finally, the state of the battery pack 1 locked by the second locking device 60 is released.

Finally, the locking performed by the first locking device 40 and the second locking device 60 is all released, and the battery pack 1 falls downwards by weight. Accordingly, the joining plate 64 of the first coupler 61 and the joining plate 68 of the second coupler 65 are separated from each other, and the battery pack 1 is released from the mounting frame 30 of a vehicle and is completely separated from the vehicle.

As describe above, after the battery pack in which a fire occurs has been released from a vehicle, a motor of the vehicle is driven by the power of another battery pack in which a fire does not occur, so the vehicle can move far from the released battery pack 1.

Accordingly, even when a fire occurs in the battery pack, the fire does not spread to a vehicle, and the vehicle and a driver can be safely protected from the fire.

Although the exemplary embodiment of the present disclosure has been described for illustrative purposes, those skilled in the art will appreciate that various modifications, additions and substitutions are possible, without departing from the scope and spirit of the disclosure as disclosed in the accompanying claims.

What is claimed is:

1. A battery release system for a vehicle, the battery release system comprising:
   a controller outputting a control signal to release a battery pack from the vehicle such that the battery pack is separated from the vehicle when the controller determines that a fire occurs in the battery pack;
   a mounting frame mounted to a vehicle body to support the battery pack; and
   a first locking device mounted to the mounting frame to lock the battery pack to the mounting frame such that the battery pack is held on the mounting frame, the first locking device being operated to release a locked state of the battery pack from the mounting frame in response to the control signal of the controller such that the release of the battery pack is performed.

2. The battery release system of claim 1, further comprising:
   a fire detection sensor detecting a fire occurring in the battery pack,
   wherein the controller is provided to determine whether a fire occurs in the battery pack on the basis of a signal of the fire detection sensor.

3. The battery release system of claim 1, further comprising:
   a manipulating device provided to be manipulated by a user to release the battery pack; and
   a second locking device mounted to the mounting frame to lock the battery pack to the mounting frame such that the battery pack is held on the mounting frame, the second locking device being operated to release the locked state of the battery pack independently from the first locking device according to the manipulation of the manipulating device by the user due to connection of the second locking device to the manipulating device.

4. The battery release system of claim 3, further comprising:
   a notification device operated by the controller to notify the user of a fire occurring in the battery pack.

5. The battery release system of claim 3, wherein the manipulating device comprises:
   a release lever provided to be manipulated by the user; and
   a release cable connected between the release lever and the second locking device to transmit a manipulation force of the user from the release lever to the second locking device.

6. The battery release system of claim 3, wherein the mounting frame comprises:
   a base frame supporting a lower part of the battery pack in a state of being coupled to the lower part of the battery pack via the first locking device; and
   an upper frame combined with the base frame and supporting the battery pack at an upper side of the battery pack in a state of being coupled to the battery pack via the second locking device.

7. The battery release system of claim 6, wherein the base frame comprises a pair of subframes provided to support the lower part of the battery pack at opposite sides of the battery pack, each of the subframes being configured to support the lower part of each of opposite end parts of the battery pack located in a longitudinal direction of the battery pack via the first locking device.

8. The battery release system of claim 6, wherein the first locking device comprises:
   a hook holding and locking a holding jaw part provided on the lower part of the battery pack; and
   an actuator fixedly mounted to each of the subframes, with the actuator connected to the hook, and forcibly rotating the hook maintaining the locked state of the holding jaw part to a position of the hook by which the locked state of the holding jaw part is released in response to the control signal output from the controller.

9. The battery release system of claim 3, wherein the second locking device comprises:
   a first coupler fixedly mounted to an upper surface of the battery pack;
   a second coupler fixedly mounted to the mounting frame; and
   a clamp clamping and engaging the first coupler and the second coupler with each other and releasing the engaged state between the first coupler and the second coupler by using a manipulation force of a user transmitted from the manipulating device.

10. The battery release system of claim 9, wherein the first coupler comprises:
    a base plate fixed to the upper surface of the battery pack;
    a column provided on the base plate by extending upwards from the base plate; and a joining plate provided on an upper part of the column, the joining plate having a shape of a disc extending in a radial direction of the disc, and the second coupler comprises:
- a base plate fixed to the mounting frame;
- a column provided on the base plate by extending downwards from the base plate; and
- a joining plate provided on a lower part of the column, the joining plate having a shape of a disc extending in a radial direction of the disc, wherein the joining plate of the first coupler and the joining plate of the second coupler are engaged with each other by the clamp while being joined to each other.

11. The battery release system of claim 10, wherein a coupling groove is provided in one of the joining plate of the first coupler and the joining plate of the second coupler, and a coupling protrusion is provided on a remaining one of the two joining plates to be inserted into the coupling groove.

12. The battery release system of claim 10, wherein the clamp comprises:
- two subblocks configured to have semicircular shapes and engaging the joining plate of the first coupler and the joining plate of the second coupler with each other while the two subblocks are coupled to each other to have a circular ring shape;
- a hinge part rotatably coupling end parts of the two subblocks to each other, and having a spring provided therein, the spring providing an elastic restoring force for rotating the two subblocks in directions opening the subblocks such that the engaged state of the two joining plates is released; and
- an engaging pin coupled to the two subblocks by passing through the two subblocks such that the two subblocks are maintained in a state of being coupled to each other, wherein the engaging pin is separated from the two subblocks by a manipulation force of a user transmitted from the manipulating device due to connection of the engaging pin to the manipulating device, so that the two subblocks are rotated in the opening directions by the spring.

13. The battery release system of claim 12, wherein a receiving groove is provided in an inner circumferential surface of each of the subblocks such that the two joining plates joined to each other are inserted into the receiving groove.

14. The battery release system of claim 1, wherein the first locking device comprises:
- a hook holding and locking a holding jaw part provided on a lower part of the battery pack; and
- an actuator fixedly mounted to the mounting frame and forcibly rotating the hook maintaining the locked state of the holding jaw part by using the control signal output from the controller to a position of the hook by which the locked state of the holding jaw part is released.

15. The battery release system of claim 1, wherein when the controller determines that the vehicle is in a stopped state while the controller determines that a fire occurs in the battery pack, the controller outputs the control signal to release the battery pack from the vehicle such that the battery pack is separated from the vehicle.

16. A battery release system for a vehicle, the battery release system comprising:
- a controller outputting a control signal to release a battery pack from the vehicle such that the battery pack is separated from the vehicle when the controller determines that a fire occurs in the battery pack;
- a mounting frame mounted to a vehicle body to support the battery pack;
- a first locking device mounted to the mounting frame to lock the battery pack to the mounting frame such that the battery pack is held on the mounting frame, the first locking device being operated to release a locked state of the battery pack from the mounting frame in response to the control signal of the controller such that the release of the battery pack is performed;
- a manipulating device provided to be manipulated by a user to release the battery pack; and
- a second locking device mounted to the mounting frame to lock the battery pack to the mounting frame such that the battery pack is held on the mounting frame, the second locking device being operated to release the locked state of the battery pack independently from the first locking device according to the manipulation of the manipulating device by the user due to connection of the second locking device to the manipulating device.

* * * * *